United States Patent Office 2,911,535
Patented Nov. 3, 1959

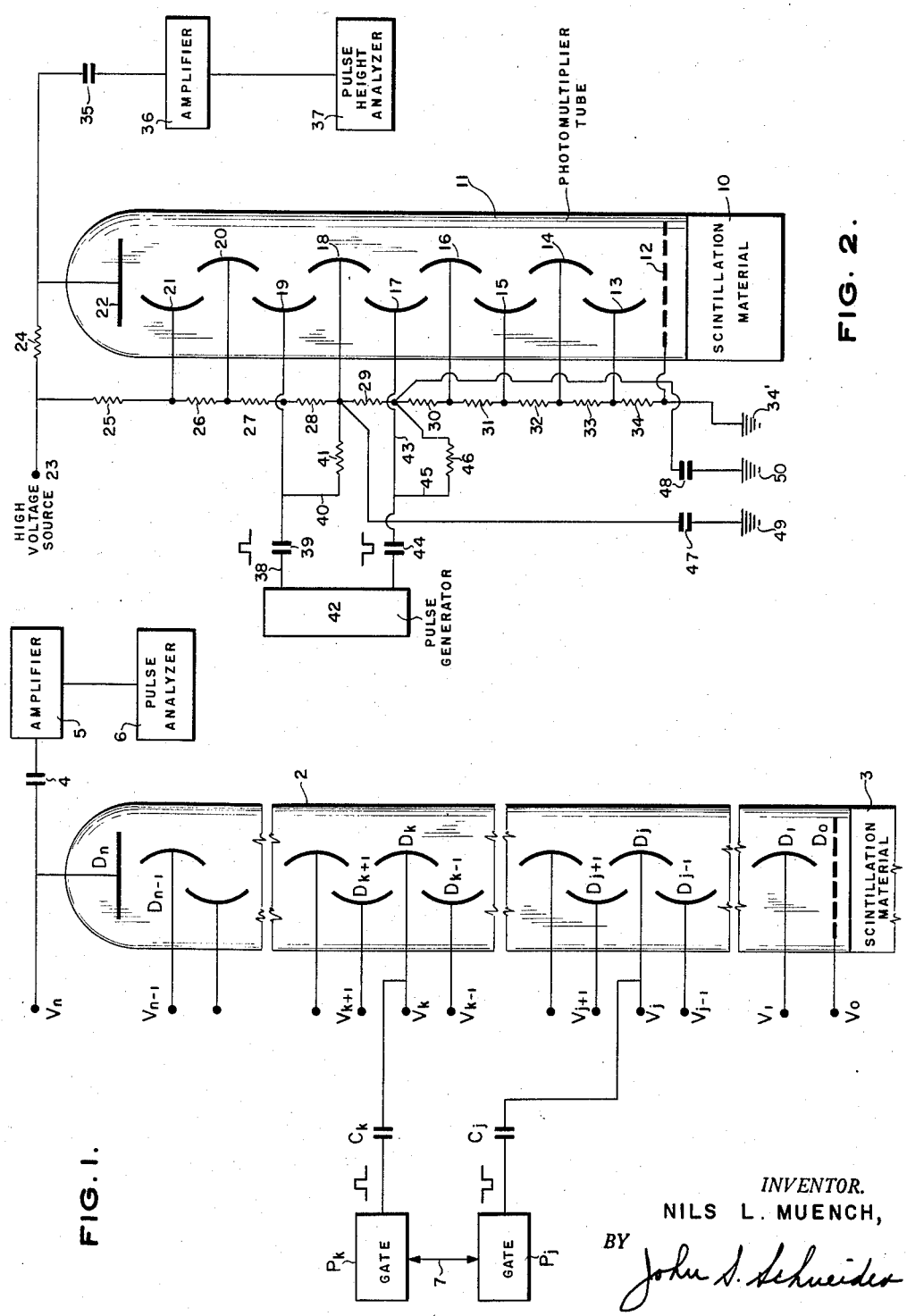

2,911,535
APPARATUS FOR PULSING A SCINTILLATION DETECTOR

Nils L. Muench, Houston, Tex., assignor, by mesne assignments, to Jersey Production Research Company, Tulsa, Okla., a corporation of Delaware Application January 8, 1957, Serial No. 633,106

6 Claims. (Cl. 250—71)

This invention concerns method and apparatus for pulsing a radiation detector on and off. More particularly, this invention concerns a method and apparatus for turning a photomultiplier tube on and off utilizing two simultaneous gate pulses of opposite polarity.

In certain radiation detection ssytems, it is desirable to turn the detector on and off for very short intervals of time. For example, in U.S. application Serial No. 616,687, filed October 18, 1956, entitled "Method of Nuclear Borehole Logging" by Nils L. Muench and Hezzie R. Brannon, Jr., now abandoned, a method of borehole logging is described wherein subsurface formations are bombarded with primary radiation such as a source of fast neutrons and the induced radiation such as gamma radiation is detected to determine the presence and amounts of substances such as chemical elements contained in the formation. In this method the source and detector are pulsed in order, for example, to differentiate between induced radiation resulting from reactions substantially early in the life of bombarding primary radiation from reactions later in the life of the bombarding primary radiation. The advantages of a pulsing system over a continuously operating system are fully discussed in the above cited patent application by Nils L. Muench and Hezzie R. Brannon, Jr. For the pulsing system to operate most efficiently, it is necessary to turn the detector on and off in extremely short periods of time whether the detector is to be used in coincidence with the "on" periods of the source or is to be used out of coincidence therewith. Therefore, it is necessary that the switching "on" and "off" of the detector be performed at a position in the detector system where the pulses to be detected and counted are still of a short time duration compared to the "on" time of the detector.

In scintillation counter detection systems a scintillating material or phosphor, such as crystals of anthracene, stilbene, etc. adapted to translate incoming radiation, such as gamma rays and neutrons, into light rays is positioned adjacent a photomultiplier. Some of the light rays emitted by the scintillating material impinge upon the photocathode of the photomultiplier and are converted into electrical pulses. A series of dynodes or anodes in the photomultiplier amplify the pulses in stages to obtain strong output electrical pulses from the photomultiplier. The output electrical pulses may then be amplified in a linear amplifier, analyzed by transmission through a discriminator (which passes pulses above or below or both above and below selected amplitudes), and a multichannel pulse height analyzer (which determines the number of pulses of each amplitude), or an integrator (which averages out the pulses with respect to amplitude and frequency), or both, and recorded.

The method and apparatus to be described herein involves applying a positive gate pulse to one or more selected dynode stages in the photomultiplier and a negative gate pulse to one or more selected dynode stages in the photomultiplier, when it is desired to turn the detector on for counting. At all other times the voltage drop or potential across the selected dynode stages is zero, hence no signal is transmitted from the photomultiplier and the detector is off.

Thus, in the detection of gamma rays by pulsing stages of the photomultiplier the effective gamma ray width involved is approximately 0.25 microsecond and if an "on" detection time of 5 microseconds is desired only $$\frac{0.25}{5.0} \cdot 100 = 5\%$$

of the gamma ray pulses are partially lost by turning the photomultiplier "on" or "off." However, if pulsing of the detector is attempted at stages of amplification later than the photomultiplier, the effective gamma ray pulse width involved is approximately 4 microseconds and if an "on" time of 5 microseconds is desired about $4/5 \times 100 = 80\%$ of the gamma ray pulses are partially lost by turning the detector or counter "on" or "off."

If a portion of a pulse is lost when the circuit is turned "on" or "off," the amplitude of that pulse will be distorted by further stages of amplification, and by transmission along a cable. If such distortion occurs, spectral analysis of the gamma rays is made difficult or impossible. U.S. patent application Serial No. 632,703, filed January 7, 1957, entitled "Method and Apparatus of Pulsing a Scintillation Detector" by H. R. Brannon, Jr., describes a method and apparatus for eliminating such difficulties for "on" times of approximately 3 microseconds or greater. Essentially this method and apparatus is directed to pulsing dynodes of the photomultiplier by providing a pulse generator connected across a pair of dynodes of the photomultiplier where the photocathode of the photomultiplier may be substituted for one of the dynodes of the pair.

The pulse generator may be any desired type. For a discussion of pulse generators, see, for example, G. N. Glasoe and J. V. Lebaeqz, Pulse Generators MIT Radiation Lab. Series, vol. 5, McGraw-Hill Book Co., Inc., New York, 1948.

The method and apparatus of the present invention is similar to the method and apparatus described in the above-cited H. R. Brannon, Jr. application; however, herein the invention comprises applying two simultaneous gate pulses of opposite polarity across "pairs of dynodes" or stages of the photomultiplier, wherein "pairs of dynodes" may include the photocathode, for pulsing the photomultiplier "on" for periods as short as a few microseconds. By use of the two-gate pulse, the gate pulses can be adjusted to cancel effects due to stray couplings which may impair resolution. A significant increase in gain stability also is achieved.

Hence, one object of this invention is to decrease or eliminate distortion introduced by the gate pulse when pulsing a photomultiplier tube.

A further object of this invention is the reduction of gain variations due to possible fluctuations in shape and amplitude of the gate pulse when pulsing a photomultiplier tube.

Briefly my invention comprises a radiation detector system including a scintillating material adapted to emit light on interaction with radiation; a photoelectric device provided with a photocathode adapted to convert said light into electrical pulses and a plurality of dynodes adapted to amplify said pulses; means connected to said photoelectric device adapted to apply a positive gate pulse and a negative gate pulse across selected dynode stages, respectively; analyzing means adapted to analyze the pulses transmitted from said photoelectric device and a source of voltage for energizing said system. The invention also encompasses a method of pulsing a radiation detector comprising the steps of applying a positive gate pulse and a negative gate pulse to selected "pairs of dynodes" of a photomultiplier respectively by means of a pulse generator to turn said detector "on" and applying a zero or negative potential across at least one of said selected "pair of dynodes" to turn said detector "off."

Fig. 1 is a schematic representation of a general circuit for pulsing a photomultiplier; and Fig. 2 is a schematic representation illustrating a specific embodiment of apparatus and a circuit for pulsing a photomultiplier.

In Fig. 1 a photomultiplier tube 2 is shown positioned adjacent scintillation material 3. A plurality of dynodes $D_1$, $D_{j-1}$, $D_j$, $D_{j+1}$, $D_{k-1}$, $D_k$, $D_{k+1}$, $D_{N-1}$ and $D_N$ (the anode) and $D_0$ (the photocathode) are arranged in tube 2. Each of the dynodes is shown connected to a source of potential V. Thus, source of potential $V_0$ is connected to the photocathode $D_0$, source of potential $V_1$ is connected to the dynode $D_1$ and so forth. The output of the anode $D_N$ is shown connected to a capacitor 4, an amplifier 5, and a suitable pulse analyzer 6. A positive gate pulse source $P_k$ is connected through a capacitor $C_k$ to $D_k$ and a negative gate pulse source $P_j$ is connected through a capacitor $C_j$ to dynode $D_j$. These pulse sources are synchronized so as to occur simultaneously as indicated by the arrowed line 7.

The negative gate pulse transmitted from source $P_j$ may be employed to stabilize the gain of the photomultiplier tube 2 with respect to changes in gate voltage because the gain between dynodes $D_{k+1}$ and $D_{k-1}$ and between $D_{j+1}$ and $D_{j-1}$ depends not only upon ($V_{k+1}$ minus $V_{k-1}$) and ($V_{j+1}$ minus $V_{j-1}$) respectively, but also on the voltages $V_k$ and $V_j$. Thus, the overall gain will change with a change in voltage $V_k$ or $V_j$, even though the voltages ($V_{k+1}$ minus $V_{k-1}$) or ($V_{j+1}$ minus $V_{j-1}$) are held fixed. That is, for example, if $V_{k+1}=500$ volts and $V_{k-1}=300$ volts, the gain from $V_{k-1}$ to $V_{k+1}$ is dependent upon whether $V_k$ is for example, 350 volts or 351 volts. If $V_k$ changes from 350 volts to 351 volts, the gain will change, but this gain change can be compensated by a similar but opposite change in voltage at $V_j$ provided the positive and negative gate pulses are proportional. Thus by applying the negative gate to $D_j$ any increase in gain between $D_{k+1}$ and $D_{k-1}$ due to a change in gate voltage will be compensated to a first approximation by a decrease in gain between $D_{j+1}$ and $D_{j-1}$. It is to be noted that the positive and negative gates each can be applied to one or more of the dynodes; it is only necessary that the positive and negative gates be applied to different dynodes.

For a more specific application of pulsing the photomultiplier, reference is now made to Fig. 2 in which is shown a scintillating crystal 10 positioned adjacent a photomultiplier generally designated 11. The photomultiplier 11 is provided with a photocathode 12 and a plurality of dynodes 13–22.

Each of the dynodes is maintained at a higher potential than the next preceding one (and the photocathode) by means of a voltage divider circuit including a high voltage source 23 in series with a plurality of resistors 24 through 34 grounded as at 34'. The output dynode 22 of the photomultiplier is connected in series to a capacitor 35, a linear amplifier 36 and a pulse height analyzer 37, which latter may include a discriminator or integrator and a recorder.

A pulse generator 42 is shown connected to two "pairs of dynodes" 18 and 19 and 16 and 17 respectively. For purposes herein "pair of dynodes" is defined as any two dynodes 13–21 and including photocathode 12. A lead 38 connects in series pulse generator 42, a capacitor 39 and dynode 19 and a lead 40 connects in series lead 38, resistor 41, high voltage source 23 and dynode 18. A lead 43 connects in series pulse generator 42, a capacitor 44 and dynode 17 and a lead 45 connects in series lead 43, a resistor 46, and the voltage divider circuit between dynodes 16 and 18.

Leads 40 and 43 are connected to capacitors 47 and 48, respectively, which are grounded at 49 and 50, respectively. Capacitors 47 and 48 insure that the voltages on dynodes (18, 16) adjacent to the dynodes pulsed (19, 17) remain constant.

In operation the detection system is turned on by application of a positive gate pulse to the "pair of dynodes" 18 and 19 and a negative gate pulse to the "pair of dynodes" 16 and 17. To turn the detection system off the pulses are applied such that a zero or negative potential is obtained across any "pair of dynodes." In the particular circuit diagram shown in the figure, for example, the detector is in an operative state when the pulse generator output applied to dynodes 18, 19 is positive and is in an inoperative state when the pulse generator output applied to dynodes 18, 19 is zero.

The switching occurs because of a property of the photomultiplier tube which provides that emission of electrons from a dynode $D_i$ is dependent upon emission of electrons from a dynode $D_{i-1}$ and the existence of a potential gradient such that $V_{Di}$ is greater than $V_{Di-1}+V_0$ where V is the potential of a dynode and $V_0$ is a certain minimum potential difference between dynodes necessary to avoid extinction of the electron stream. $V_0$ is a property of a particular type of photomultiplier.

The time required to switch the detector "on" or "off" is limited only to the rise or decay time of the pulse generator. This time may be reduced to a fraction of a microsecond. For purposes herein, the photomultiplier tube causes negligible switching delay since the time required for the photomultiplier to become operative or inoperative is essentially the transit time for an electron travelling from one dynode to another. This transit time may be of the order of $10^{-8}$ seconds.

The distortion of the gamma ray spectrum generated by the scintillating material is reduced to a quantity that is essentially determined by characteristics of the phosphor alone. In any event, it is small for detector "on" times as large as approximately 2 microseconds which is 10 times as large as the rise and decay time for an easily realizable switching pulse or 10 times the decay time of the phosphor, whichever is larger.

In operation the gate pulses to turn on the photomultiplier may be, for example, 50 volts in amplitude and 3 microseconds in duration of time. A positive pulse is applied to dynode 19 which is normally maintained at the potential of the next dynode below it. The time, $R_{41}C_{39}$ (resistance 41, capacitor 39), is made long compared to 3 microseconds, so that the square gate pulse will be transmitted undistorted. When the positive gate pulse transmitted raises the potential of dynode 19 from zero to 50 volts, the photomultiplier is turned on and will amplify any signal produced at the photocathode. The dynode 17 is normally maintained, for example, 100 volts positive relative to the next dynode 16 below it. The negative gate pulse reduces this voltage from 100 to 50 volts. This reduction in voltage reduces the overall gain somewhat; however, this reduction in overall gain may be compensated for in other dynode stages at fixed, higher potentials.

Among the advantages of my method is reduction of feed-through of the positive gate pulse into the anode circuit. For example, when the positive gate only is applied to dynode 19, radiative and capacitive coupling between the dynode 19 and the dynode or dynode 22 results in the appearance of the gate pulse in the output circuit of the photomultiplier 11.

This feed-through of the gate pulse may seriously impair the resolution of the spectrometer system. However, the application of a similar negative pulse at dynode 17 can effectively cancel the feed-through of the positive gate pulse. The amplitude of the negative pulse may be adjusted to effect substantially complete cancellation of the undesired pulse, and thereby provides superior resolution of the spectrometer.

Another advantage is the improved gain stability of the photomultiplier with resultant improved resolution of the spectrometer. This results because the negative gate can be simply produced by passing the positive gate through a one stage amplifier with a gain of unity. Therefore, the negative pulse is proportional to the positive pulse. The supposed change in gate voltage may occur either during the 3 microseconds "on" period by a lack of "flatness" of the gate pulse, or it may occur as a time drift due to heating and aging of components.

As noted with reference to Fig. 1, the dynodes selected for pulsing are not limited to the connections illustrated in Fig. 2. For example, if desired a positive pulse may be applied to two "pairs of dynodes" and a negative pulse may be applied to two other "pairs of dynodes." Further, as to the circuit voltage regulating tubes may be substituted for the resistor voltage dividers shown; or the pulses may be applied by direct coupling wherein the D.C. level of the pulse is determined by the pulse generator.

Having fully described the nature, objects and operation of my invention, I claim:

1. Apparatus for pulsing "on" and "off" a photomultiplier comprising a pulse generator connected to at least two "pairs of dynodes" of said photomultiplier whereby a positive gate pulse is applied to at least one "pair of dynodes" and a negative gate pulse is applied to at least one other "pair of dynodes."

2. Apparatus for pulsing "on" and "off" a photomultiplier comprising means connected to said photomultiplier adapted to apply a positive gate pulse across at least one "pair of dynodes" and to apply a negative gate pulse across at least one other "pair of dynodes."

3. In a radiation detector system for use in logging wells including a scintillating material adapted to emit light rays on interaction with incoming radiation, a photoelectric device provided with a photocathode adapted to convert said light into electrical pulses and a plurality of dynodes adapted to amplify said pulses in stages and analyzing means adaped to analyze the pulses transmitted from said photoelectric device and a source of voltage for energizing said system, the improvement comprising means connected to at least two of said dynode stages adapted to apply a positive gate pulse to at least one of said dynode stages and a negative gate pulse to at least one other of said dynode stages.

4. A radiation detector system comprising a scintillating material adapted to emit light rays on interaction with incoming radiation, a photoelectric device provided with a photocathode adapted to convert said light into electrical pulses and a plurality of dynodes adapted to amplify said pulses in stages, means connected to said photoelectric device adapted to apply a positive gate pulse to at least one stage of said photoelectric device and to apply a negative gate pulse to at least one other stage of said photoelectric device, analyzing means adapted to analyze the pulses transmitted from said photoelectric device and a source of voltage for energizing said system.

5. A radiation detector system including a scintillating crystal adapted to emit light rays on interaction with incoming radiation, a photomultiplier provided with a photocathode adapted to convert said light rays into electrical pulses and a plurality of dynodes adapted to amplify said pulses, analyzing means adapted to analyze the pulses transmitted from said photoelectric device and a source of voltage for energizing said system, the improvement comprising means connected to at least two "pairs of dynodes" in said photoelectric device adapted to apply a positive gate pulse to at least one "pair of dynodes" and a negative gate pulse to at least one other "pair of dynodes."

6. A radiation detector system comprising a scintillating crystal adapted to emit light on interaction with incoming radiation, a photomultiplier provided with a photocathode adapted to convert said light rays into electrical pulses and a plurality of dynodes adapted to amplify said pulses and a pulse generator connected to at least two "pairs of dynodes" in said photomultiplier, a positive gate pulse being applied to at least one "pair of dynodes" and a negative gate pulse being applied to at least one other "pair of dynodes."

References Cited in the file of this patent

UNITED STATES PATENTS

| | | |
|---|---|---|
| 2,554,933 | Wouters | May 29, 1951 |
| 2,594,703 | Wouters | Apr. 29, 1952 |
| 2,610,303 | Bell | Sept. 9, 1952 |